May 5, 1953 D. RICHMAN 2,637,807

SUPERREGENERATIVE SYSTEM FOR RECEIVING ANGULAR-VELOCITY-MODULATED WAVE SIGNALS

Filed June 25, 1948 3 Sheets-Sheet 1

INVENTOR.
DONALD RICHMAN
BY John A. Harvey
ATTORNEY

May 5, 1953

D. RICHMAN 2,637,807

SUPERREGENERATIVE SYSTEM FOR RECEIVING ANGULAR-VELOCITY-MODULATED WAVE SIGNALS

Filed June 25, 1948

3 Sheets-Sheet 2

INVENTOR.
DONALD RICHMAN

BY John A. Harvey

ATTORNEY

INVENTOR.
DONALD RICHMAN
BY John A. Harvey
ATTORNEY

Patented May 5, 1953 2,637,807

UNITED STATES PATENT OFFICE 2,637,807

SUPERREGENERATIVE SYSTEM FOR RECEIVING ANGULAR - VELOCITY - MODULATED WAVE SIGNALS

Donald Richman, Flushing, N. Y., assignor to Hazeltine Research, Inc., Chicago, Ill., a corporation of Illinois Application June 25, 1948, Serial No. 35,244

21 Claims. (Cl. 250—20)

Figure 1:
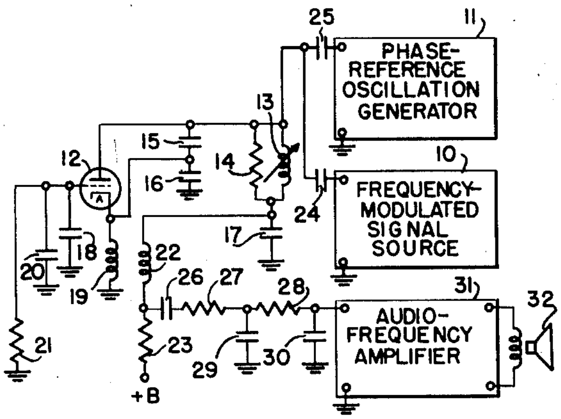

The present invention is directed to wave-signal receiving systems of the superregenerative type which are particularly suited for the reception of angular-velocity-modulated wave signals. The expression "angular-velocity-modulated wave signal" is used in the present specification and appended claims in a generic sense to define a wave signal which is either frequency or phase modulated in accordance with the intelligence to be conveyed. However, since frequency modulation is the more usual form of transmission, the invention will be described in detail in that connection.

It is well understood that a superregenerative receiver comprises a regenerative oscillatory circuit and a quenching arrangement. The latter constitutes an integral part of the regenerative circuit in the case of receivers of the self-quenching type or constitutes a separate signal source coupled to the regenerative circuit in the case of separately quenched receivers. In either form, the quenching arrangement controls the conductance of the regenerative circuit, causing it to undergo repeating cycles in which the conductance has positive and negative values in alternate operating intervals. During any negative-conductance interval, this circuit exhibits an extraordinarily high gain and produces oscillations that are quenched or damped in the next succeeding interval of positive conductance. The oscillations which are thus periodically produced have a characteristic, such as an amplitude characteristic, which manifests the modulation of a received wave signal at the time the oscillations are initiated. Those oscillations may be utilized in any of several well-recognized methods to derive the modulation components of the received signal.

The use of such a receiver in the reception of amplitude-modulated waves is exceedingly well known at the present time. In general, the quenching frequency is selected to be low relative to the oscillatory frequency of the regenerative circuit but at least twice as high as the highest frequency-modulation component to be accommodated. In operation, the amplitude variations of the received signal control the oscillation peak amplitude or the duration of the peak oscillation interval in each quench cycle so that an output signal obtained from the receiver manifests the modulation components of the received signal.

It is also known that superregenerative receivers may be employed in the reception of frequency-modulated wave signals. If such a receiver is side-tuned to the mean frequency of the frequency-modulated signal, the frequency excursions are converted to amplitude variations in view of the sloping response which is characteristic of side-tuned operation. Having effected a conversion to amplitude modulation, the receiver may function in a manner generally similar to that explained above to derive the desired modulation components of the received signal. Since the receiver is primarily responsive to amplitude variations of the applied signal, undesired amplitude modulation superimposed on the received frequency-modulated signal will, of course, be derived with the frequency-modulation components.

The present invention concerns a novel superregenerative system for receiving a frequency-modulated wave signal and exhibiting improved amplitude-modulation rejecting properties. The invention is related to the invention disclosed and claimed in a concurrently filed application of Bernard D. Loughlin, Serial No. 35,257, entitled "Angular-Velocity-Modulation Wave-Signal Translating System," now Patent 2,613,316 granted October 7, 1952. This patent describes a superregenerative system for translating an angular-velocity-modulated wave signal and for obtaining the modulation components thereof by means of a phase comparison effected in a superregenerative or blocking type of detector in which the phase of the received signal is contrasted with a phase-reference signal. In the Loughlin patent just mentioned, the phase-reference signal is comprised by the residual oscillations in the superregenerative detector which in this instance has such damping that oscillations of one quench cycle carry over to the next quench cycle. In the instant arrangement, a continuous-phase reference signal is supplied by a separate signal generator.

The system to be described is also closely related to the subject matter of applicant's concurrently filed application, Serial No. 35,243, entitled "Super regenerative System for Receiving Angular-Velocity-Modulated Wave Signals," now Patent 2,613,315, granted October 7, 1952. This patent derives the modulation components of an angular-velocity-modulated signal by comparing the phase of the received signal, as manifested by the signal output of a superregenerative amplifier, with that of a continuous-phase reference signal supplied by a signal generator including a blocking oscillator which has hang-over or residual oscillations enduring throughout each blocking interval. In Patent 2,613,315, the phase comparison is made in a phase detector separate and distinct from the super regenerative stage, whereas in the present application the phase comparison is effected within the superregenerative amplifier.

It is an object of the present invention to provide a new and improved superregenerative system for receiving an angular-velocity-modulated wave signal.

It is another object of the invention to provide a superregenerative system, for receiving an angular-velocity-modulated wave signal, having improved amplitude-modulation rejecting properties.

It is a further object of the invention to provide an improved system for receiving an angular-velocity-modulated wave signal in which the desired modulation components are derived by virtue of a phase detection action accomplished within a superregenerative receiver.

It is an additional object of the invention to provide an improved system for receiving an angular-velocity-modulated wave signal in which the desired modulation components are derived by a phase detection or comparison performed during periods of maximum sensitivity of a superregenerative receiver.

It is another object of the invention to provide a system for receiving an angular-velocity-modulated wave signal in which the desired modulation components are derived by a phase detection or comparison which takes place in a superregenerative receiver during intervals when the oscillations generated in the receiver have achieved a high amplitude level.

In accordance with the present invention, a system for receiving an angular-velocity-modulated wave signal having a given mean frequency comprises an oscillation generator for supplying a continuous-phase reference signal having a frequency different from that of the aforesaid mean frequency. The system includes a superregenerative wave-signal phase detector for utilizing the angular-velocity-modulated signal and phase-reference signal. The system also includes means for applying the phase-reference signal to the detector at least during a selected interval of each quench cycle of the detector. The detector is center-tuned for signals of the aforesaid mean frequency and side-tuned for the phase-reference signal and is responsive to both of the last-mentioned signals during the aforesaid selected intervals of the quench cycles to effect therein a phase comparison of the angular-velocity-modulated signal and the phase-reference signal to develop an output signal having characteristic variations representing the modulation components of the angular-velocity-modulated signal. Additionally, the system includes means responsive to the phase relations of the angular-velocity-modulated signal and the phase-reference signal during the intervals of phase comparison for controlling an operating characteristic of the system to tend to maintain a substantially fixed apparent phase relationship between the angular-velocity-modulated signal and the phase-reference signal.

In accordance with one mode of operation of the invention, the phase comparison takes place in the vicinity of each maximum-sensitivity period of each quench cycle of the superregenerative receiver. Since the oscillations existing in a superregenerative receiver are at a very low level during maximum-sensitivity intervals, that method of practicing the invention may be termed a "low-level phase detection."

In accordance with an alternate mode of operation of the invention, the phase comparison occurs after the oscillations of the superregenerative receiver have achieved an amplitude level that is relatively high even though it may be less than saturation-level amplitude. This latter method of practicing the invention may be considered a "high-level phase detection."

For a better understanding of the present invention, together with other and further objects thereof, reference is had to the following description taken in connection with the accompanying drawings, and its scope will be pointed out in the appended claims.

Figure 2A:
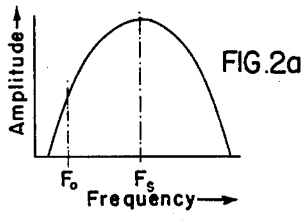
Figure 4:
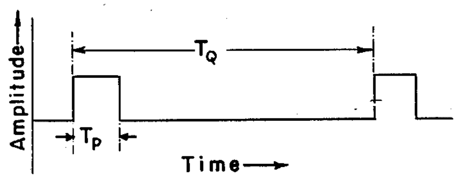

In the drawings, Fig. 1 is a circuit diagram, partly schematic, of a complete system for receiving an angular-velocity-modulated wave signal and embodying the present invention in one form; Figs. 2*a*–2*d* include vector diagrams and curves utilized in explaining the operation of the Fig. 1 arrangement; Fig. 3 is a schematic representation of a system generally similar to that of Fig. 1 but including the invention in modified form; Fig. 4 is a curve utilized in explaining the operation of the Fig. 3 arrangement; while Figs. 5, 6, 7, 8, and 9 represent further wave-signal receiving systems embodying additionally modified forms of the present invention.

Referring now more particularly to Fig. 1, the system there represented is adapted to receive and translate an angular-velocity-modulated wave signal, such as a frequency-modulated carrier-wave signal. This system, as will become apparent from the explanation hereinafter of its mode of operation, is a type of low-level superregenerative phase detector in accordance with the present invention. The frequency-modulated signal to be translated is indicated as originating in a source 10 which may comprise an antenna system for intercepting a signal transmitted from a remote transmitting station. This signal will be considered as having a given mean frequency.

As previously indicated, the present invention contemplates deriving the modulation components of the received frequency-modulated signal by a process of phase detection accomplished within a superregenerative circuit and to that end the over-all receiving system comprises a phase-reference oscillation generator 11 for supplying a continuous-phase reference signal. The expression "continuous-phase reference signal" as used here and in the appended claims is intended to denote a signal that has continuity of phase and a phase that is not directly affected by the received frequency-modulated signal. However, the reference signal need not necessarily be uniform in amplitude and need not necessarily have a constant frequency. It will be evident in discussing other specific modifications of the invention that the phase-reference signal, while being of continuous phase, may have relatively high and relatively low amplitude levels in alternate operating intervals of the generator 11 and further its frequency may be varied by a control potential in a manner related to the modulation of the received frequency-modulated signal for a purpose to be described hereinafter. Nevertheless, the expression "continuous-phase reference signal" is not intended to describe the signal generated in a superregenerative amplifier having "carry-over" and used to amplify the received frequency-modulated signal. A superregenerative amplifier is said to have carry-over when the damping is such that the oscillations generated in one quench cycle carry over and have an appreciable amplitude at the start of the next succeeding quench cycle. In the remaining discussion of the Fig. 1 arrangement, it will be assumed that generator 11 supplies a continuous-wave signal having a frequency different from the mean frequency of the received frequency-modulated signal but having an effective intensity that is very large compared with that of the received signal.

The over-all receiving system additionally comprises a superregenerative wave-signal receiver for making a phase comparison of the frequency-modulated signal from the source 10 and the phase-reference signal from the oscillator 11 during a selected interval of each quench cycle of the superregenerative receiver to develop an output signal having characteristic variations representing the modulation components of the frequency-modulated signal.

In order to avoid confusion, the superregenerative receiver will be referred to hereinafter as a superregenerative phase detector and, as shown in Fig. 1, it is of the self-quenching type. It is comprised of a triode type of vacuum tube 12 arranged in the circuit of a Colpitts oscillator. The resonant frequency-determining circuit includes an inductor 13, a damping resistor 14, and condensers 15, 16 and 17. One terminal of the resonant circuit is directly connected to the anode of the tube 12 and its opposite terminal is effectively connected to the control electrode thereof through a condenser 18. The cathode is connected to the junction of condensers 15 and 16 and is grounded through a signal-frequency choke coil 19. The parallel combination of a condenser 20 and a resistor 21 connected to the control electrode is a quench-frequency stabilizing network of a type disclosed and claimed in applicant's copending application Serial No. 788,765, filed November 28, 1947, entitled "Self-Quench Superregenerative Receiver," now Patent 2,616,039, issued October 28, 1952. The values of the components 20 and 21 may be chosen so that the network has a low impedance to audio frequencies to avoid audio degeneration.

Included in the phase detector is a self-quenching arrangement comprising means responsive to the phase relations of the compared signals for controlling an operating characteristic of the over-all system. Specifically, the quench frequency of the phase detector is controlled to tend to maintain a substantially fixed apparent phase relationship between the received frequency-modulated signal and the phase-reference signal. The particular self-quenching arrangement used is known as an anode-circuit resonant quenching network, fully described and specifically claimed in a related application of Donald Richman, Serial No. 28,595, filed May 22, 1948, and entitled "Self-Quench Superregenerative Amplifier." It comprises the condenser 17 connected in a series circuit with an inductor 22, a decoupling resistor 23, and a source of unidirectional potential +B. The series circuit may have a resonant frequency approximately equal to one-half of the self-quenching frequency desired to be established in the phase detector.

To effect a phase comparison, the frequency-modulated signal source 10 is coupled to the resonant circuit 13—17 through a coupling condenser 24, and the oscillation generator 11 is likewise coupled to the resonant circuit through a condenser 25.

A further coupling condenser 26 and a filter network, comprising series resistors 27 and 28 and shunt condensers 29 and 30, couple an audio-frequency amplifier 31 to the resistor 23, thereby to apply an output signal from the phase detector to the audio-frequency amplifier. The amplifier may include any desired number of stages, and a sound-signal reproducing device 32 is coupled to its output terminals.

In considering the operation of the described arrangement, it is convenient initially to refer to the superregenerative action of the phase detector including the tube 12. The condenser 17 is one element of the resonant circuit which includes the inductor 22 and is charged through the latter. By virtue of the resulting resonant charging of the condenser, the potential developed thereacross may achieve a value approaching twice that of the unidirectional source +B. With the condenser 17 charged, an excitation potential is applied to the anode-cathode circuit of the tube 12 to render that tube conductive. During its conductive interval, which corresponds to the characteristic negative-conductance interval of a superregenerative receiver, oscillations are produced in the oscillatory circuit at a frequency determined by the resonant circuit 13—17. As the oscillations are generated, the condenser 17 is discharged reducing the anode excitation potential of the tube. When the tube is rendered nonconductive, the circuit enters upon an interval of positive conductance and the oscillations previously generated are quenched. Thereafter, the condenser 17 is recharged preparatory to the generation of oscillations in the next quench cycle. Except for the resonant feature of the self-quenching network, this is characteristic self-quench superregenerative operation. The quenching frequency is low relative to the oscillatory frequency of the superregenerator but is at least twice as high as the highest modulation-frequency component to be detected.

In utilizing the superregenerative circuit as a phase detector, as contemplated by the present invention, the frequency-determining circuit is tunable so that the received frequency-modulated signal and the phase-reference signal may jointly determine the response of the detector. As shown, the inductor 13 is adjustable and the tuning characteristic is indicated in Fig. 2*a*. For the specific case under consideration, the oscillatory frequency of the superregenerative phase detector is approximately equal to the mean frequency of the frequency-modulated signal and the acceptance band of the detector includes the frequency of the phase-reference signal. Expressed differently, the phase detector is approximately center-tuned to the mean frequency $F_S$ of the frequency-modulated signal and is side-tuned to the frequency $F_O$ of the phase-reference signal supplied by the oscillator 11. The manner in which a phase comparison of the frequency-modulated signal and the phase-reference signal is effected in the phase detector including the tube 12 will be explained with reference to the vector diagram of Fig. 2*b*.

Any signal applied to a superregenerative circuit may be considered to be effective to produce a transient at the oscillatory frequency of that circuit. Thus, for the case under consideration, the received frequency-modulated signal and the phase-reference signal individually cause a transient to be produced in the superregenerative circuit including the tube 12. The relative amplitude of the transients is determined jointly by the selectivity characteristic of the superregenerative circuit and the relative amplitude of the signals causing the transients. Similarly, the relative phase of the transients is related to that of the signals producing the transients at the period of maximum sensitivity.

Figure 2B:
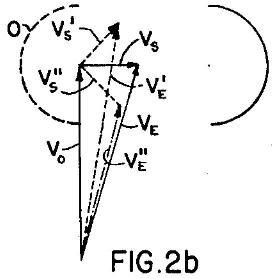
Figures 3, 5:
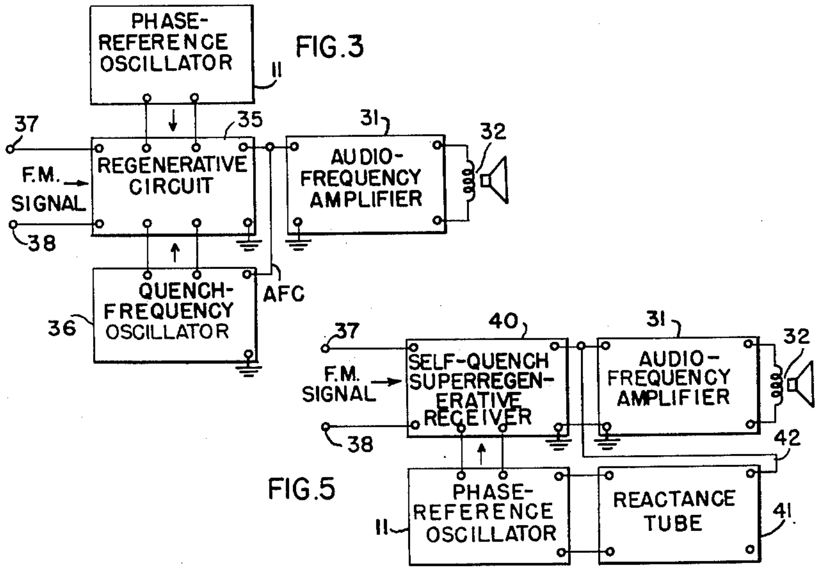

Referring now to Fig. 2b, the vector $V_o$ represents the transient produced by the phase-reference signal from the oscillator 11 while the transient produced by the frequency-modulated signal is represented by the vector $V_s$ rotating about the vector $V_o$. With the received frequency-modulated signal and the phase-reference signal continuously and concurrently applied to the phase detector, the response of the detector in any quench cycle is governed by the effective signal amplitude in its resonant circuit 13—17 at the period of maximum sensitivity. Maximum sensitivity occurs in every quench cycle at the time when the conductance of the phase detector has an approximate zero value in a transition from positive to negative conductance. For the phase relations indicated by the vectors $V_o$ and $V_s$ in Fig. 2b, the effective signal amplitude at the interval of maximum sensitivity is indicated by the resultant full-line vector $V_E$ Since the oscillations generated in any quench cycle of the phase detector have an initial amplitude related to that of the effective signal amplitude $V_E$, the time at which the oscillations achieve saturation-level amplitude after the initiation of a quench cycle is controlled by (and the self-quenching frequency is established in accordance with) the effective signal amplitude. If the relative frequencies of the phase-reference signal and the frequency-modulated signal are such that the same phase relations denoted by the vectors $V_o$ and $V_s$ are present at each maximum-sensitivity period of the superregenerative phase detector, the self-quenching frequency is maintained at a fixed value.

Due to the frequency modulation, it will be apparent that, in general, the rate of rotation of the vector $V_s$ relative to the reference vector $V_o$ varies. For the condition in which the received signal vector $V_s$ has advanced to attain the position shown by the broken-line vector $V_s'$ at a maximum-sensitivity period of the phase detector, the change in relative phase causes the effective signal amplitude present in the resonant circuit 13—17 of the phase detector to be represented by the broken-line vector $V_E'$. This indicates an increased effective signal amplitude as compared with the vector $V_E$. An increase in the effective signal amplitude causes the oscillations generated in the phase detector 12 to achieve saturation level earlier in the quench cycle and increases the self-quenching frequency. Since the self-quenching frequency has increased, the signal vector $V_s'$ will not have advanced as far ahead of the position of the vector $V_s$ by the time the maximum-sensitivity period occurs in the next quench cycle. In other words, the self-quenching frequency varies in such sense and to such extent that it tends to cause the period of maximum sensitivity to occur when the phase-reference vector $V_o$ and the signal vector have a given apparent phase relation such as that shown in the full-line construction $V_o$—$V_s$ of Fig. 2b.

By way of further example, assume that a condition is encountered due to the frequency modulation in which the maximum-sensitivity period of the phase detector occurs when the frequency-modulated signal has an apparent phase relative to the phase-reference signal shown by the dash-dot vector $V_s''$ of Fig. 2b. For that condition, the effective signal amplitude $V_E''$ is less than the first-described effective signal amplitude $V_E$. The reduction in effective signal amplitude slows down or reduces the self-quenching frequency. This delays the next maximum-sensitivity period of the phase detector so that the apparent phase relation of the frequency-modulated signal and the phase-reference signal approaches a given value, such as that shown by vectors $V_o$ and $V_s$, at the next maximum-sensitivity period. Thus, it will be seen that the change in self-quenching frequency under the assumed conditions here also tends to restore the apparent phase relationship of the frequency-modulated signal and the phase-reference signal to a predetermined average value, for example that indicated by the vectors $V_s$ and $V_o$. The change in quench frequency is inherent and is automatically obtained in the self-quenching superregenerative phase detector.

The described variation in quench frequency tending to maintain a desired apparent phase relation of the compared signals (the frequency-modulated signal and the phase-reference signal) will be recognized as a function quite analogous to that of the conventional automatic-frequency-control system except for the fact that the latter seeks to maintain a fixed frequency relation. However, in neither case is the desired end result precisely attained because some slight differential is required to continue the control. Nevertheless, the control does seek to restore and preserve prescribed relations as explained.

As shown in Fig. 2b, the apparent phase relation of the compared signals is controlled so that, on an average basis, they have a quadrature phase relation. The control may, if desired, tend to establish a different specific apparent phase relation but the quadrature relation is usually preferable because with it the receiver exhibits its maximum handling capabilities.

It is evident from what has been said that the phase detector including the tube 12 makes a phase comparison of the frequency-modulated signal and the phase-reference signal during the maximum-sensitivity period of each quench cycle and automatically adjusts its self-quenching frequency in accordance with their instantaneous phase relationship. The phase relationship of these signals from one phase comparison interval to the next varies in accordance with the frequency modulation of the signal received from the source 10. For that reason, the variations in the self-quenching frequency represent the modulation components of the angular-velocity-modulated signal. The average anode-cathode current of the tube 12 is directly related to the quench frequency and, therefore, may be utilized to derive an output signal having amplitude variations in accordance with the desired modulation components of the frequency-modulated signal. Such signal potentials are established across the resistor 23, and are supplied through the coupling condenser 26 and the filter 27—30 to the audio-frequency amplifier 31. The filter extracts quench-frequency components and radio-frequency components from the output signal to supply essentially only the desired modulation components to the audio-frequency amplifier 31. The modulation components, after amplification in the amplifier 31, are reproduced by the sound-reproducing device 32.

As previously explained, the phase relations of the frequency-modulated signal and the phase-reference signal during the intervals of phase comparison control the self-quenching frequency of the phase detector. The change in quench frequency is in a direction tending to establish a predetermined average phase relationship at the maximum-sensitivity periods, such as that indicated by the vectors $V_S$ and $V_O$. Viewed on an average basis, this apparent phase relationship is maintained substantially fixed although at any particular maximum-sensitivity period the phase relationship may deviate in accordance with the rate of change in frequency of the frequency-modulated signal relative to the phase-reference signal.

As the instantaneous frequency of the frequency-modulated signal changes in accordance with the modulation which it conveys, the signal may produce an effective signal amplitude having any value within a range denoted by the circle O of Fig. 2*b*. Stable conditions result when the locus of the effective or resultant signal vector is represented by the full-line portion of the circle O because the automatic change in quench frequency occasioned when the locus of the effective signal vector is within that area is degenerative, being in a sense directly to restore the fixed apparent phase relationship referred to above. On the other hand, the broken-line portion of the circle O relates to unstable conditions. Should the effective signal vector in any maximum-sensitivity period fall within the region of the broken-line portion of the circle O, the change in quench frequency is in a regenerative sense to adjust the system to its stable operating condition. The automatic quench-frequency variations realized in the superregenerative phase detector which seek to maintain the desired fixed apparent phase relationship of the frequency-modulated signal and the phase-reference signal, and which always occur in the proper sense to keep the system in its stable condition, are highly desirable because such operation avoids phase ambiguities. No ambiguity arises so long as the over-all system operates in its stable condition.

The described arrangement inherently rejects low-frequency amplitude modulation which may be superposed on the frequency-modulated signal. The system exhibits this property because on an average or long term basis the automatic adjustment of the self-quenching frequency to stabilize and maintain a fixed apparent phase relation of the frequency-modulated signal and the phase-reference signal in maximum-sensitivity periods effectively locks the quench frequency to a submultiple or fraction of the frequency difference of the compared signals. In the presence of low-frequency amplitude modulation, the apparent phase relation to which the system stabilizes may change causing a transient change in the output signal. However, when the change has been effected and the apparent phase relation in maximum-sensitivity periods has been stabilized, the output signal again has the same average value as obtained in the absence of amplitude modulation.

Figure 2C:
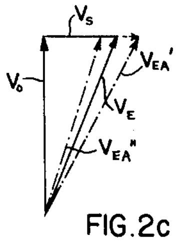

The vector diagram of Fig. 2*c* demonstrates the ability of the described system to reject undesired high-frequency amplitude modulation superimposed on the frequency-modulated signal applied to the phase detector. Again the vectors $V_O$, $V_S$ and $V_E$ represent the phase-reference signal, the frequency-modulated signal and the effective signal amplitude of the phase detector, respectively. Amplitude modulation superimposed on the frequency-modulated signal may, in the extremes, add in phase or out of phase with the frequency-modulated signal. Where an in-phase relation is present, the signal vector $V_S$ has an added length so that the effective signal amplitude for the phase detector is represented by the broken-line vector $V_{EA'}$. For the out-of-phase condition, the signal vector $V_S$ is decreased and the effective signal amplitude for the phase detector is represented by the dash-dot vector $V_{EA''}$. So long as the effective amplitude of the phase-reference signal is very much larger than that of the frequency-modulated signal, as indicated in Fig. 2*c*, the change in amplitude of the effective signal represented by the vectors $V_E$, $V_{EA'}$ and $V_{EA''}$ is not appreciable and the amplitude modulation thus has an inappreciable effect in changing the self-quench frequency of the phase detector. The arrangement is, accordingly, insensitive to amplitude modulation superimposed on the frequency-modulated signal.

It must be realized that the references to the intensity or amplitude of the phase-reference signal are directed to the intensity of that signal as it appears in view of the selectivity of the phase detector as distinguished from the amplitude measured at the output terminals of the oscillation generator 11. Since the phase detector is side tuned to the phase-reference signal, the signal amplitude produced by the generator 11 must be selected to take into consideration the frequency-response characteristic of the detector.

Figure 2D:
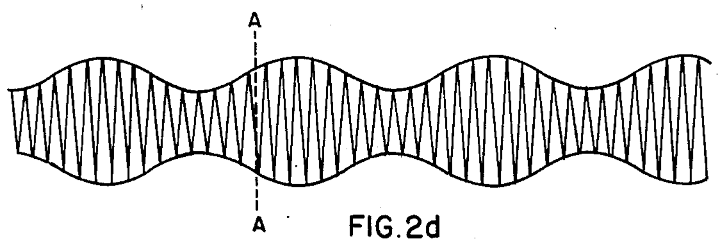

For the purpose of explanation, the operation of the Fig. 1 arrangement may be viewed a little differently by considering that the frequency-modulated signal from the source 10 and the phase-reference signal from the oscillator 11 produce in the frequency-determining circuit of the phase detector a composite signal having an envelope modulated at the beat frequency. Such a beat signal is represented in Fig. 2*d*. The variations in the self-quenching frequency of the phase detector tend to cause the maximum-sensitivity periods of the detector to occur at a given amplitude and slope of the beat-signal envelope, as indicated by the broken construction line A—A. This is the stable operating condition for which the changes in quench frequency are degenerative and are effective to cause the periods of maximum sensitivity to occur at corresponding points in each cycle of the beat signal, assuming the quench frequency to be such that a phase comparison is made in each cycle of the beat signal. If a lower value of quenching frequency is used, the phase comparison may be made at every second cycle, every third cycle, or some other such submultiple of the frequency of the beat-frequency signal. From this it is seen that the phase detector tends to have a quench frequency which is locked to the frequency of the beat signal or to a subharmonic thereof as mentioned previously.

For convenience, the arrangement of Fig. 1 has been explained on the premise that the superregenerative detector is approximately center tuned to the modulated signal $F_S$ and side tuned to the phase-reference signal $F_O$, as indicated in Fig. 2*a*. As a practical matter, the system is adjusted in that manner for many installations because frequently the modulated signal $F_S$ is relatively weak and requires the added gain incident to center tuning. Also, peak tuning to the modulated signal usually provides the best signal to noise ratio. However, other operating conditions are both permissible and useful. For example, the superregenerative detector may be side tuned in any of a variety of fashions to both signals. The modulated signal may fall on one side of the selectivity characteristic and the phase-reference signal may fall on the other or both may be located on the same side. Usually, the modulated signal is the closer to the peak response frequency of the detector.

When the detector is side tuned to the modulated signal, the locus O in Fig. 2*b* of the vector Vs is no longer a circle because of the side response effect which introduces an amplitude change in the vector Vs with frequency deviations. The operation of the system is nonetheless essentially as given above. It will be found that for operating conditions in which the mean frequency of the modulated signal is greater than that of the phase-reference signal, best results occur when the stable conditions are about as described in connection with Fig. 2*b*. On the other hand, if the mean frequency of the modulated signal is less than the frequency of the phase-reference signal, a vector diagram that is the mirror image of Fig. 2*b* represents the preferred operating condition.

One embodiment of the Fig. 1 arrangement found to have practical utility included the following values of its circuit components which are recited here only by way of illustration:

| | |
|---|---|
| Tube **12** | ½ section of a 12AT7 duo triode. |
| Resistor **14** | 8,200 ohms. |
| Resistor **21** | 5,000 ohm potentiometer adjusted for mean quench frequency. |
| Resistor **23** | 10,000 ohms. |
| Resistor **27, 28** | 100,000 ohms. |
| Condenser **15, 16** | 10 micromicrofarads. |
| Condenser **17** | 200 micromicrofarads. |
| Condenser **18** | 500 micromicrofarads. |
| Condenser **20** | 25 microfarads. |
| Condenser **24, 25** | 1 micromicrofarad. |
| Condenser **26** | 0.01 microfarad. |
| Condenser **29, 30** | 1,000 micromicrofarads. |
| +B | 250 volts. |

Superregenerative circuit:

| | |
|---|---|
| Oscillatory frequency | 21 megacycles |
| Mean quench frequency | 80 kilocycles |

The invention, of course, is not limited to superregenerative phase detectors of the self-quenching type. The embodiment of Fig. 3 indicates schematically its application to a separately quenched arrangement. In Fig. 3, unit 35 is a regenerative oscillatory circuit with which is associated a separate quench-frequency oscillator 36. These two units together constitute a superregenerative phase detector of the separately quenched type. The oscillator 36 comprises means for supplying a quench signal to accomplish superregenerative action. Terminals 37 and 38 represent input terminals coupled to the regenerative circuit and to which the frequency-modulated signal may be applied from any desired source or antenna system. The connection designated AFC from the output terminals of the regenerative circuit to the input terminals of the quench-frequency oscillator denotes an automatic-frequency-control circuit, supplying the modulation-signal output of the phase detector to the quench-frequency oscillator. The oscillator 36 will be understood to include a frequency-control system which utilizes the applied automatic-frequency-control signal to adjust the operating frequency of the oscillator to tend to maintain fixed apparent phase relationships between the frequency-modulated signal and the phase-reference signal. The phase-reference oscillator, the audio-frequency amplifier, and the sound-signal utilizing device of Fig. 3 are essentially the same as those of Fig. 1 and are identified by similar reference characters.

This arrangement will be seen to operate in essentially the same manner as the embodiment of Fig. 1. The quench-frequency oscillator 36 may, if desired, be a blocking oscillator and the automatic-frequency-control signal may be applied to the blocking circuit of the blocking oscillator to adjust its blocking frequency, thereby to control the quenching frequency of the phase detector. Of course, this adjustment of the quench-frequency oscillator and the resultant control of the frequency of the quenching signal supplied to the regenerative circuit 35 are, as previously described, in a sense to maintain a substantially fixed apparent phase relationship between the frequency-modulated signal and the phase-reference signal.

The significant difference in the operation of a self-quenching superregenerative phase detector of the type shown in Fig. 1 and the separately quenched detector utilized in Fig. 3 may be easily understood with reference to the curve of Fig. 4. This curve is idealized and represents the saturation current pulses appearing in the anode circuit of the regenerator tube of a superregenerative phase detector. There are two time factors which are material and either may vary to cause the average anode current of the detector to vary with the modulation of an applied signal. The first factor, designated $T_Q$, is the period which corresponds to the frequency of the quenching signal and the other factor $T_P$ is the duration of the saturation pulse in a particular quench cycle. The average value of anode current is related to these factors in accordance with the following expression:

$$\bar{I}=i_p\times\frac{T_P}{T_Q} \qquad (1)$$

where $i_P$ is the peak amplitude of the saturation pulse. The self-quenching type of superregenerative detector varies the time interval $T_Q$ but maintains a substantially fixed saturation-pulse duration $T_P$. In the separately quenched detector, and in the absence of any frequency control on the quench oscillator, the saturation-pulse duration $T_P$ varies but the quench period $T_Q$ is essentially constant. It is apparent from Equation 1 that in either case the average anode current of the superregenerative phase detector manifests the influence of amplitude variations of the effective applied signal and, therefore, represents the modulation components derived from that signal. While the self-quench arrangement adjusts its quenching frequency automatically, the externally quenched system of Fig. 3 utilizes the modulation-signal output of the phase detector as a frequency control for the quench oscillator 36 by which to vary the quench period $T_Q$.

A further modification of the invention is represented in Fig. 5 which again utilizes a self-quenching superregenerative receiver 40 as a phase detector. In this modification, a reactance tube 41 or any other conventional frequency-controlling means is coupled to the phase-reference oscillator 11 to control the frequency of the phase-reference signal. The modulation-signal output from the self-quenching superregenerative receiver is supplied by a connection 42 to the input circuit of the reactance tube, thereby to adjust the frequency of the phase-reference signal in accordance with the instantaneous amplitude of the signal output from the phase detector. The other components of the Fig. 5 embodiment are generally the same as those of Fig. 3 and are identified by the same reference characters.

If the operation of the reactance tube 41 is neglected momentarily, the Fig. 5 arrangement operates in the same manner as the arrangement of Fig. 1 to derive the modulation components of the applied frequency-modulated signal. Since the apparent phase relationship of the frequency-modulated signal and the phase-reference signal is determined by the relative frequencies of those signals, the desired fixed apparent phase relationship may also be maintained by controlling their relative frequencies to crush the frequency deviations inherently present when a frequency-modulated signal is compared with a fixed frequency reference signal. This type of control is introduced by the reactance tube 41 which operates so to control the frequency of the oscillator 11 that it tends to follow the instantaneous frequency modulation of the frequency-modulated signal, thus to reduce the relative apparent phase differences of the signals as between successive intervals of phase comparison by the phase detector 40. The action of the reactor tube 41 thus augments the effect of the automatic variations of the self-quenching frequency of the phase detector 40 as these variations tend to maintain a constant phase relation between the frequency-modulated signal and the reference signal appearing in the resonant circuit of the phase detector. The dual control, comprising variations in the self-quenching frequency of the phase detector and variations in the frequency of the phase-reference signal, increases the stability of the system.

Further improvement in the operation of systems of the type previously discussed may be achieved by supplying the frequency-modulated signal to the phase detector through an amplitude limiter which may remove some undesired amplitude modulation that may be superimposed on that signal. It may also be desirable to supply the frequency-modulated signal through a channel which features automatic volume control or gain control so that the relative intensities of the frequency-modulated signal and the phase-reference signal are maintained at comparatively fixed values. Thus Fig. 6, which illustrates an application of the present invention to a complete television receiving system, features a gain control to limit the frequency-modulated signal to a relatively constant amplitude level.

Figure 6:
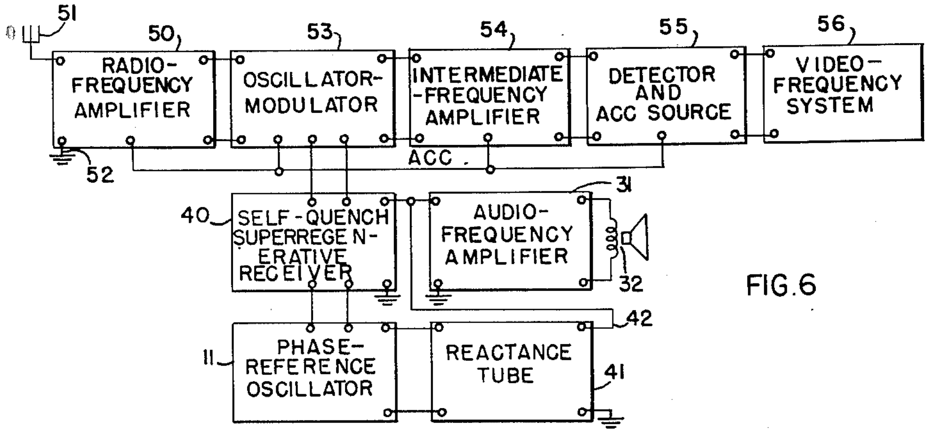

The television receiver of Fig. 6 comprises a radio-frequency amplifier 50 of any desired number of stages having an input circuit coupled to an antenna-ground system 51, 52. Connected in cascade with the amplifier 50 are an oscillator-modulator 53, an intermediate-frequency amplifier 54, a detector and automatic-contrast-control (ACC) source 55 and a video-frequency amplifier and reproducer system 56. The unit 56 will be understood to include one or more stages of video-frequency amplification, the image-reproducing device, the usual scanning systems and the synchronizing-signal separator for supplying synchronizing signals to such scanning systems. The automatic-contrast-control potential derived from unit 55 is applied to one or more of the tubes in the radio-frequency amplifier 50, the oscillator-modulator 53 and the intermediate-frequency amplifier 54 in a conventional manner.

Assuming that the sound signal accompanying the desired television signal is frequency-modulated, the sound system included in the television receiver may be the same as that represented in Fig. 5, corresponding components thereof being identified by similar reference characters. The frequency-modulated sound signal may be supplied to the sound-signal translating system through the connection extending from the output circuit of the oscillater-modulator 53 to the input terminals of the self-quench super-regenerative receiver 40 utilized as a phase detector.

Referring briefly to the operation of the system, the television signals intercepted by the antenna system 51, 52 are selected and amplified in the radio-frequency amplifier 50 and are delivered to the oscillator-modulator 53 wherein they are converted into intermediate-frequency signals. The intermediate-frequency signal is selectively amplified in the intermediate-frequency amplifier 54, is detected in the detector 55, and the video-frequency modulation components are supplied to the video-frequency system 56 for utilization in reproducing an image conveyed by the received television signal. The automatic-contrast-control potential derived in the unit 55 controls the gain of the units 50, 53 and 54 to maintain the intensity of the signal input to the detector 55 within a narrow range of values for a wide range of received signal intensities.

Sound signals accompanying the received television signal are converted by the unit 53 to a sound intermediate-frequency signal which is supplied to the phase detector 40 wherein, by the process of phase comparison with the reference signal from the oscillator 11, the sound-modulation components are derived and applied to the audio-frequency amplifier 31. After amplification therein, the sound signals are reproduced by the device 32. The automatic-contrast-control connection, by controlling the gain of the radio-frequency amplifier 50, the oscillator-modulator 53, and the intermediate-frequency amplifier 54, maintains the intensity of the sound intermediate-frequency signal supplied to the phase detector 40 within a relatively narrow range for a wide range of received signal intensities.

Figure 7:
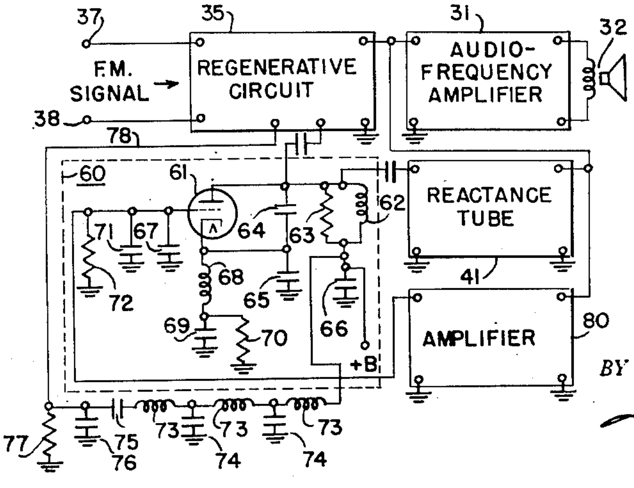

A particularly useful and compact receiving system embodying the present invention is represented in Fig. 7 and features the use of a blocking oscillator 60 as the continuous-phase reference signal source. A blocking oscillator is similar in nature to a superregenerative circuit in that in each oscillations are periodically generated and then damped. Each has a quenching action and it is possible to derive the quenching signal for one from the quenching circuit of the other. That is, the superregenerative circuit may be self-quenching and may supply a quenching signal to the blocking oscillator or the blocking oscillator may serve as both the quench signal source for a separately quenched detector and the phase-reference source. The latter arrangement is used in the Fig. 7 embodiment.

The blocking oscillator 60 is of the Colpitts type and includes a triode vacuum tube 61 and an associated frequency-determining circuit 62—66. The anode of the tube 61 is connected to one side of the frequency-determining circuit; the control electrode is coupled through a condenser 67 to the opposite side thereof; while the cathode is connected to the junction of condensers 64 and 65. The cathode is also connected to ground through a signal-frequency choke coil 68 and a self-quenching network comprising a condenser 69 and a parallel-connected resistor 70. The network provided by the condenser 71 and a resistor 72 in the grid circuit of the tube 61 is utilized for stabilization. The damping of the blocking oscillator, effected by the resistor 63, is chosen so that the oscillator has what is known as "hang-over." A blocking oscillator with hang-over is one in which the oscillations generated in one conductive interval of the oscillator tube carry over in the tuned circuit of the oscillator to the next conductive interval so that residual oscillations are present in the tuned circuit throughout each blocking period. Or it may be defined as a relaxation oscillator that has residual oscillations throughout the blocking intervals which intervene the oscillation-generating periods.

The quenching signal to be applied to the regenerative circuit 35 to achieve superregenerative action is derived from the blocking oscillator 60. To that end, periodic pulses of potential derived from the periodic pulses of anode current of the tube 61 are applied with a suitable time delay to the quenching circuit of the regenerative unit 35. The delay is derived in a time-delay network comprising series-connected inductors 73, 73 and shunt-connected condensers 74, 74. The input terminals of the time-delay network are coupled to the anode-cathode circuit of the blocking-oscillator tube 61. Its output terminals are connected to the quenching circuit of the regenerative unit 35 through a stabilizing network provided by condensers 75 and 76 and a resistor 77. When the regenerative circuit is of the Colpitts type as shown in Fig. 1, the network 76, 77 may be included in the control-electrode circuit of the regenerator tube and this may be accomplished by having the connection 78 extend to the control electrode of that tube.

With the described connections, a quenching signal which has a frequency corresponding to the blocking frequency of the oscillator 60 is applied to the regenerative circuit 35. The time relation established by the time-delay network 73, 74 is chosen so that the regenerative circuit 35 exhibits periods of maximum sensitivity during the saturation intervals of the blocking oscillator 60. With that timing relation, there are applied to the regenerative circuit 35 at each period of maximum sensitivity both the frequency-modulated signal and the high-intensity phase-reference signal because the signal output of the oscillation generator 60 has a high value during its saturation or oscillation-generating intervals. Hence, a phase comparison may be accomplished within the regenerative circuit 35 functioning as a superregenerative phase detector in the manner previously described.

In order to maintain a substantially fixed apparent phase relationship between the frequency-modulated signal and the phase-reference signal, the modulation-signal output of the regenerative circuit is applied to a reactance tube 41 coupled to the frequency-determining circuit of the blocking oscillator 60 to adjust its oscillatory frequency. At the same time the modulation-signal output may be applied, after amplification in an amplifier 80, to the grid-stabilizing circuit 71, 72 of the tube 61. Since the potential developed in the stabilizing circuit 71, 72 in conjunction with that of the self-quenching network 69, 70 governs the blocking frequency of the oscillator 60, the added control enables the quenching frequencies of both the blocking oscillator and the regenerative circuit 35 to be adjusted concurrently with the oscillatory frequency of the blocking oscillator. The variations in quenching and oscillating frequencies are chosen to be in a sense to establish and maintain a fixed apparent phase relationship between the frequency-modulated signal and the phase-reference signal.

All of the arrangements considered thus far are of the low-level type in that the phase comparison made in the superregenerative phase detector occurs during its periods of maximum sensitivity. When the phase detector is of the self-quenching type, as in the embodiments of Figs. 1, 5 and 6, saturation-mode operation is employed. However, when the phase detector is of the separately or externally quenched type, as in the modifications of Figs. 3 and 7, the phase detector may be operated in either the linear or saturation mode. In saturation mode, the oscillations produced in each quench cycle of the superregenerative detector reach saturation-level amplitude before they are quenched, whereas in linear mode the oscillations are quenched before attaining saturation-level amplitude.

Figure 8:
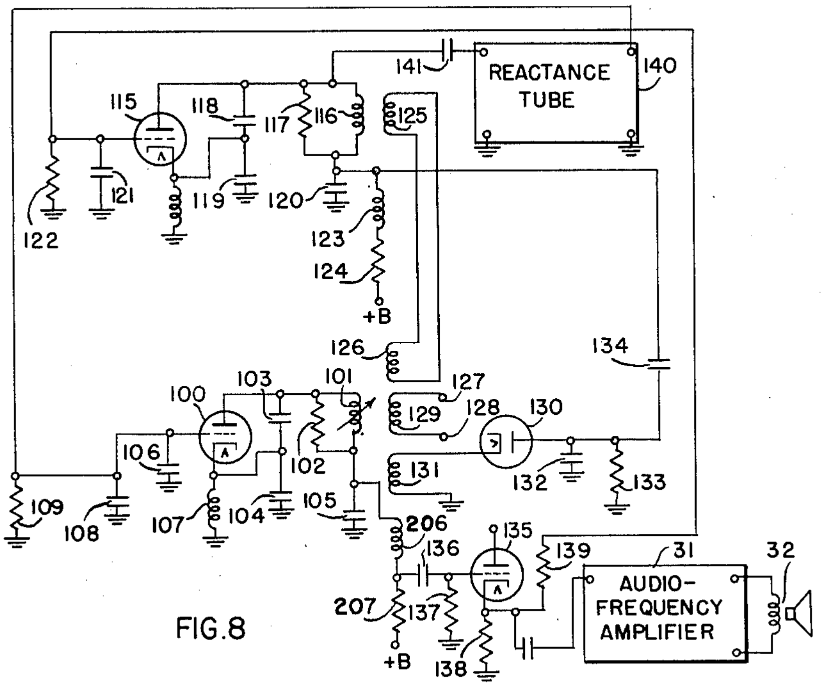
Figure 9:
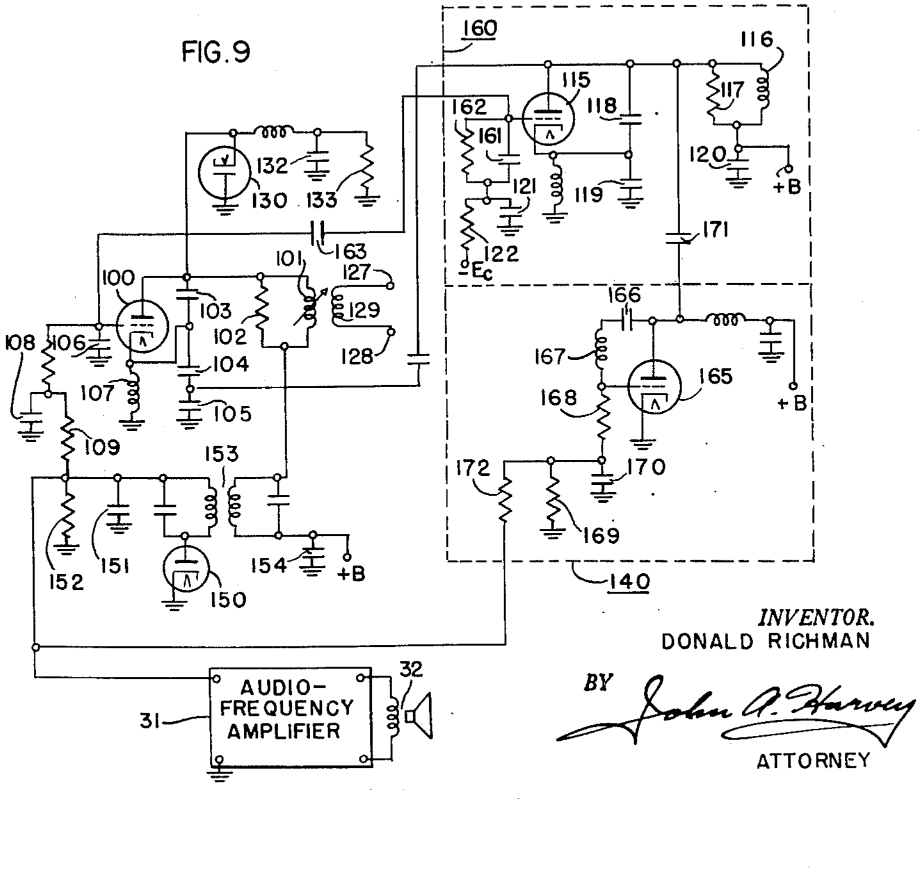

High-level phase detection in accordance with the present invention is practiced in the embodiments of Figs. 8 and 9. In Fig. 8, the superregenerative phase detector includes a triode vacuum tube 100 and an associated frequency-determining circuit 101—105. The frequency-determining circuit is directly connected with the anode of the tube 100 and is coupled to the control electrode thereof through a condenser 106. The junction of the condensers 103 and 104 is connected to the cathode of the tube 100 which is also grounded through a signal-frequency choke coil 107. The stabilizing network associated with the control electrode includes a condenser 108 and a resistor 109 which have values so selected that its time constant effects direct-current and audio-frequency degeneration. That is, this network develops signal potentials in accordance with the direct-current and audio-frequency components of the phase detector. Anode-circuit self-resonant quenching is utilized as in the arrangement of Fig. 1, the quenching network including the condenser 105, an inductor 206, a resistor 207 and a unidirectional source +B. However, the quenching action of the detector is under the control of and is synchronized with a phase-reference signal generator, as will be made clear hereinafter.

The phase-reference signal is supplied by a blocking oscillator of the Colpitts type having anode-circuit resonant quench. The blocking oscillator is provided by a triode vacuum tube 115 and a frequency-determining circuit 116—120. A stabilizing network 121, 122 is associated with the control electrode of the tube 115 to stabilize its blocking frequency. The quenching network for the blocking oscillator includes the condenser 120, an inductor 123, a resistor 124 and a source of unidirectional potential +B. A link circuit, including an inductor 125 inductively coupled with the inductor 116 and an inductor 126 inductively coupled with the inductor 101 of the frequency-determining circuit of the superregenerative phase detector, supplies the phase-reference signal to the latter. The frequency-modulated signal may be supplied to the phase detector from input terminals 127 and 128 which are connected to an inductor 129 inductively coupled with the inductor 101 of the frequency-determining circuit of the detector.

The superregenerative phase detector includes means for limiting the oscillations generated therein to a value which is less than saturation-level amplitude. The limiting means is shown as a diode limiter arrangement including a diode rectifier 130 coupled through an inductor 131 to the resonant circuit 101—105 of the phase detector. A condenser 132 and a resistor 133 provide the load circuit for the diode limiter and this load circuit has a discharge time constant that is long as compared with the saturation period of the phase detector. In the modification under consideration, it is preferred that the diode limiter be operative during the early portion of each oscillation interval of the superregenerative phase detector but be disabled for the final portion of such period. Accordingly, means are provided for disabling the limiter preferably during intervals in which the phase comparison is to be made. This means includes a condenser 134 which couples the load circuit 132, 133 of the diode limiter 130 to the self-quenching network of the blocking oscillator 115 to derive a blocking potential for the diode in response to and in a fixed time relation with the saturation interval of the blocking oscillator 115. It will become clear presently that pulsing of the diode 130 from the oscillator 115 and through the described circuit permits that oscillator to exert a control over and synchronize the quenching of the detector.

In order to establish a substantially fixed apparent phase relationship between the frequency-modulated signal and the phase-reference signal, the arrangement of Fig. 8 contemplates adjustment of the blocking frequency of the blocking oscillator 115 as well as adjustment of its oscillatory frequency although either one may be utilized alone. Adjustment of the blocking frequency is accomplished by a cathode follower 135 which is coupled across the resistor 207 of the phase detector through a condenser 136 and a resistor 137. The high-potential terminal of the cathode load resistor 138 of the cathode follower is coupled through a resistor 139 to the stabilizing network 121, 122 of the blocking-oscillator tube 115.

A reactance tube 140 is coupled to the resonant circuit 116—120 of the blocking oscillator through a coupling condenser 141. The simulated reactance introduced into the blocking-oscillator resonant circuit by the reactance tube 140 is controlled in accordance with the detected modulation components available in the network 108, 109 of the phase detector. This network is connected to the input circuit of reactance tube 140.

The output signal of the phase detector is supplied through the cathode follower 135 to the audio-frequency amplifier 31 and sound-signal reproducing device 32.

In the operation of the high-level phase detector of Fig. 8, the detector may be center-tuned to the mean frequency of the frequency-modulated signal applied to terminals 127, 128. It is then side-tuned in relation to the frequency of the phase-reference signal supplied over the link circuit 125, 126 from the blocking oscillator 115. The blocking oscillator 115 has such damping that residual oscillations carry over from one oscillation-generating period to the next, which means that the blocking oscillator has hangover. The blocking actions in the phase detector 100 and the blocking oscillator 115 are timed so that each oscillation interval of the phase detector 100 starts before but overlaps an oscillation-generating interval of the blocking oscillator 115, and the oscillations periodically generated by the phase detector have a maximum amplitude of the same order of magnitude as those generated by the blocking oscillator 115.

Having established the operating conditions referred to in the preceding paragraph, the operation of the over-all system is as follows. In any given quench cycle of the phase detector 100, the oscillations which are initiated have a phase related to that of the frequency-modulated signal during the period of maximum sensitivity of the detector. These oscillations, which start off at a relatively low level, increase in amplitude exponentially. The maximum amplitude level obtained is limited by the diode limiter 130 which effectively damps the phase detector. When the saturation interval is initiated in the blocking oscillator, a strong pulse of blocking potential is supplied from the anode-cathode circuit thereof to the diode limiter 130. In this manner the diode limiter is disabled at a time when the phase-reference signal is being applied to the phase detector. The relative phase of the oscillations then existing in the phase detector as compared with that of the phase-reference signal determines the rectification space current which flows in the tube 100 and hence the time required to discharge the condenser 105 and terminate the particular oscillation-generating period of the phase detector. In other words, the phase comparison is made at a time in each quench cycle of the phase detector when oscillations are being generated with approximately saturation-level amplitude. The duration of the saturation-level interval of the phase detector in any quench cycle will vary with the phase relation of the signals compared during the phase-comparison interval, being small when the compared signals are in phase and increasing as those signals become out of phase. The variations in the saturation-level intervals cause related changes in the quench frequency of the detector and, therefore, the average anode-cathode current of the detector reflects the modulation components of the received frequency-modulated signal.

The output signal of the phase detector is not only utilized in the audio-frequency system 31, 32 but also controls the blocking frequency of the blocking oscillator. Adjustment of the blocking frequency of the blocking oscillator determines the time at which the diode limiter 130 is disabled and, therefore, the time at which the oscillations of the phase detector begin to increase to saturation-level amplitude. This is in the nature of a quench-frequency variation in a sense which tends to maintain substantially fixed apparent phase relationships between the compared signals. The same type of phase control is occasioned by the reactance tube 140 which receives the signal output from the network 108 and 109 of the phase detector, which output also varies with the modulation components. The control effects augment one another to establish substantially fixed apparent phase relations between the frequency-modulated signal supplied to terminals 127, 128 and the phase-reference signal supplied by oscillator 115.

One particular advantage of the high-level detector of Fig. 8 is that the limiter 130, by limiting the amplitude level of the oscillations in the phase detector prior to the instant of phase comparison, substantially eliminates the effect of undesired amplitude modulation which may be superimposed on the applied frequency-modulated signal.

The embodiment of Fig. 9 is similar to that of Fig. 8 and corresponding components thereof are identified by the same reference characters. In Fig. 9, however, the blocking oscillator 115 supplies the quenching signal to the superregenerative phase detector. Since the phase detector is of the externally quenched type, it is not necessary to disable the diode limiter 130 in order to permit the oscillations in the detector to achieve saturation-level amplitude because the termination of the negative-conductance interval of the phase detector is primarily under the control of the applied quench signal. Another difference between the arrangements of Fig. 8 and Fig. 9 resides in the fact that a quench-harmonic detector is utilized in the latter to derive an output signal from the phase detector representing the modulation components of the applied frequency-modulated signal. This detector is provided by a diode rectifier 150 coupled with a load circuit, comprising a condenser 151 and a resistor 152, across the secondary winding of a double-tuned transformer 153. The stabilizing network 108, 109 of the phase detector 100 includes the resistor 152 so that a bias may be applied therethrough from the quench-harmonic detector to the control electrode of the tube 100. The primary side of the double-tuned transformer 153 is included in the anode circuit of the tube 100 which is completed by a source of unidirectional potential +B, by-passed by a condenser 154. The transformer 153 is tuned to select a desired harmonic-frequency component of the quench frequency of the phase detector.

The blocking oscillator is included within the broken-line rectangle 160 and has a blocking network 161, 162 and a bias potential $-E_c$ associated with its control electrode. A condenser 163 derives a quenching signal from the blocking network of the oscillator and supplies it to the input circuit of the tube 100 to effect superregenerative operation in the phase detector. The oscillatory frequency of the blocking oscillator is under the control of a reactance tube included within the broken-line rectangle 140.

The reactance tube is of conventional design, including a vacuum tube 165 having its anode and control electrode coupled together through a condenser 166 and an inductor 167. The control electrode is connected to ground through resistors 168 and 169 and a condenser 170. The simulated reactance introduced by the reactance tube into the resonant circuit 116—120 of the blocking oscillator 160 through a coupling condenser 171 is varied in accordance with the signal output of the quench-harmonic detector 150. To this end, the load impedance 151, 152 of the quench-harmonic detector is coupled to the input circuit of the reactance tube through a resistor 172.

This arrangement effects a phase comparison in essentially the same way as that described in connection with Fig. 8 and their operation is generally similar. However, the timing of the oscillation intervals of the phase detector 100 relative to the saturation intervals of the blocking oscillator 160 is automatically established because the quench signal applied to the phase detector from the network 161, 162 of the blocking oscillator initiates oscillations in the phase detector slightly in advance of the saturation-level interval of the blocking oscillator. Consequently, when the blocking oscillator saturates, the oscillations of the phase detector have already achieved their maximum amplitude as determined by the diode limiter 130. The use of the quench-harmonic detector 150 takes advantage of the fact that the average value of all the signal components included in the anode-cathode current of the phase detector varies in accordance with the phase relations present during the intervals of phase comparison. Therefore, while the modulation components may be obtained directly from the average current of the phase detector they may also be derived on the basis of the average value of a selected quench-harmonic component of that current. The control of the reactance tube 140 by the output signal of the quench-harmonic detector 150 adjusts the oscillatory frequency of the blocking oscillator 160 to tend to maintain a substantially fixed apparent phase relationship between the angular-velocity-modulated signal and the phase-reference signal as observed in succeeding phase-comparison intervals of the phase detector.

In all the described modifications of this invention, the phase-reference signal is a continuous signal as already defined and the phase detector has sufficient circuit damping that the oscillations generated in one quench cycle are suppressed to an insignificant value prior to the next succeeding oscillatory interval of the detector. Where low-level detection is practiced, the phase relations of the frequency-modulated signal and the phase-reference signal at the intervals of maximum sensitivity of the phase detector cause the average current of the detector to vary in accordance with the modulation of the frequency-modulated signal. For the high-level case, on the other hand, the phase comparison is made on the basis of the relative phase of the reference signal and the oscillations that have previously been established in the detector by the frequency-modulated signal and with a phase related to that signal. Here, too, the average current of the detector varies with the phase relations during the phase-comparison intervals and hence represents the modulation components of the frequency-modulated signal.

In practicing the invention with arrangements of the type represented in Fig. 1, it is possible to realize the combined effects of low-level and high-level phase comparison. The low-level phase comparison of the received signal and the reference signal at the maximum-sensitivity period of any quench cycle determines the build-up time of the oscillations generated in that cycle. Where the reference signal has a sufficiently high amplitude, it may determine the duration of the oscillation interval characteristic of high-level operation. These effects may augment one another and in any such case the arrangement utilizes the principles of both low-level and high-level detection in deriving the modulation components of the received signal. In some cases, it is preferred to have the detector center-tuned to the frequency-modulated signal and side-tuned to the phase-reference signal as previously explained. In each modification, the phase detector has unusually high amplitude-modulation rejecting properties which is especially desirable in the reception of frequency-modulated signals for, in the absence of such properties, undesired amplitude modulation superposed on the received signal is undesirably derived and reproduced.

In discussing the several modifications of the invention, the expression "apparent phase relation" has been used to signify the phase relations of the modulated signal and the phase-reference signal at any comparison interval. These signals are not of the same frequency and consequently have no fixed phase relation. The expression "apparent phase relation" is intended to mean the relative phases of such signals at the observed interval.

While there have been described what are at present considered to be the prefered embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for receiving an angular-velocity-modulated wave signal having a given mean frequency comprising: an oscillation generator for supplying a continuous-phase reference signal having a frequency different from that of said mean frequency; a superregenerative wave-signal phase detector for utilizing said angular-velocity-modulated signal; and means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

2. A system for receiving an angular-velocity-modulated wave signal having a given mean frequency comprising: an oscillation generator for supplying a continuous-phase reference signal having a frequency different from that of said mean frequency and having an effective intensity much greater than that of said angular-velocity-modulated signal; a superregenerative wave-signal phase detector for utilizing said angular-velocity-modulated signal; and means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

3. A system for receiving an angular-velocity-modulated wave signal having a given mean frequency comprising: an oscillation generator for supplying a continuous-phase reference signal having a frequency different from that of said mean frequency; a superregenerative wave-signal phase detector for utilizing said angular-velocity modulated signal and said phase-reference signal; and means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling a frequency characteristic of said system to tend to maintain a substantially fixed apparent phase relationship between said angular-velocity-modulated signal and said phase-reference signal.

4. A system for receiving an angular-velocity-modulated wave signal comprising: an oscillation generator for supplying a continuous-phase reference signal; a superregenerative wave-signal phase detector for utilizing said angular-velocity-modulated signal; and means for applying said phase-reference signal to said detector at least during a selected interval of each quench cycle of said detector; said detector being responsive to said angular-velocity-modulated signal and said phase-reference signal during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling the quench frequency of said detector to tend to maintain a substantially fixed apparent phase relationship between said angular-velocity-modulated signal and said phase-reference signal.

5. In a system for receiving an angular-velocity-modulated wave signal having a given mean frequency comprising: an oscillation generator for supplying a continuous-phase reference signal having a frequency different from that of said mean frequency; a super-regenerative wave-signal phase detector of the self-quenching type for utilizing said angular-velocity-modulated signal and said phase-reference signal; and means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said detector including a self-quenching arrangement responsive to the phase relations of said angular-velocity-modulated signal and said phase-reference signal during said intervals of phase comparison for controlling the self-quench frequency of said detector to tend to maintain a substantially fixed apparent phase relationship between said angular-velocity-modulated signal and said phase-reference signal.

6. A system for receiving an angular-velocity-modulated wave signal comprising: an oscillation generator for supplying a continuous-phase reference signal; a super-regenerative wave-signal phase detector of the separately quenched type for utilizing said angular-velocity-modulated signal; means for supplying a quench signal to said detector; and means for applying said phase-reference signal to said detector at least during a selected interval of each quench cycle of said detector; said detector being responsive to said angular-velocity-modulated signal and said phase-reference signal during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for adjusting the frequency of said quench signal to tend to maintain a substantially fixed apparent phase relationship between said angular-velocity-modulated signal and said phase-reference signal.

7. A system for receiving an angular-velocity-modulated wave signal comprising: an oscillation generator for supplying a continuous-phase reference signal; a super-regenerative wave-signal phase detector of the separately quenched type for utilizing said angular-velocity-modulated signal; means for deriving from said oscillation generator and for applying to said detector a quench signal; and means for applying said phase-reference signal to said detector at least during a selected interval of each quench cycle of said detector; said detector being responsive to said angular-velocity-modulated signal and said phase-reference signal during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said oscillation generator to adjust the frequency of said quench signal to tend to maintain a substantially fixed apparent phase relationship between said angular-velocity-modulated signal and said phase-reference signal.

8. A system for receiving an angular-velocity-modulated wave signal comprising: a blocking oscillator having residual oscillations throughout each blocking interval for supplying a continuous-phase reference signal; a superregenerative wave-signal phase detector of the separately quenched type for utilizing said angular-velocity-modulated signal; means for deriving from said oscillator and for applying to said detector a periodic quench signal having a frequency corresponding to the blocking frequency of said oscillator; means for applying said phase-reference signal to said detector at least during a selected interval of each quench cycle of said detector; said detector being responsive to said angular-velocity-modulated signal and said phase-reference signal during said selected intervals of said quench cycles to effect therein a phase comparison of said angular-velocity-modulated signal and said phase-reference signal to develop an output signal having characteristic variations representing the modulation components of said angular-velocity-modulated signal; and means for applying said output signal of said detector to said oscillator to adjust the blocking frequency thereof to tend to maintain a substantially fixed apparent phase relationship between said angular-velocity-modulated signal and said phase-reference signal.

9. A system for receiving an angular-velocity-modulated wave signal having a given mean frequency comprising: an oscillation generator for supplying a continuous-phase reference signal having a frequency different from that of said mean frequency; and a superregenerative wave-signal phase detector for utilizing said angular-velocity-modulated signal and said phase-reference signal; means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; and frequency-control means coupled to said generator and responsive to said output signal of said detector for controlling the frequency of said phase-reference signal to tend to maintain a substantially fixed apparent phase relationship between asid angular-velocity-modulated signal and said phase-reference signal.

10. A system for receiving an angular-velocity-modulated wave signal having a given mean frequency comprising: an oscillation generator for supplying a continuous-phase reference signal having a frequency different from that of said mean frequency; a superregenerative wave-signal phase detector for utilizing said angular-velocity-modulated signal and said phase-reference signal; means for applying said phase-reference signal to said detector at least during a selected interval of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; a reactance tube coupled to said generator for controlling the frequency of said phase-reference signal; and means for applying said output signal of said detector to said reactance tube to adjust the frequency of said phase-reference signal to tend to maintain a substantially fixed apparent phase relationship between said angular-velocity-modulated signal and said phase-reference signal.

11. A system for receiving an angular-velocity-modulated wave signal having a given mean frequency comprising: an oscillation generator for supplying a continuous-phase reference signal having a frequency different from that of said mean frequency; a super-regenerative wave-signal phase detector, for utilizing said angular-velocity-modulated signal and said phase-reference signal, having a period of maximum sensitivity in each quench cycle; and means for applying said phase-reference signal to said detector at least during said maximum-sensitivity period of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

12. A system for receiving an angular-velocity-modulated wave signal comprising: an oscillation generator for supplying a continuous-phase reference signal; a super-regenerative wave-signal phase detector for utilizing said angular-velocity-modulated signal; and means for applying said phase-reference signal to said detector at least during a selected interval of each quench cycle of said detector; said detector being responsive to said angular-velocity-modulated signal and said phase-reference signal during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling the quenching frequency of said detector and the frequency of said phase-reference signal to tend to maintain a substantially fixed apparent phase relationship between said angular-velocity-modulated signal and said phase-reference signal.

13. A system for receiving an angular-velocity-modulated wave signal having a given mean frequency comprising: a blocking oscillator having residual oscillations throughout the blocking intervals between the generation of oscillations for supplying a continuous-phase reference signal having a frequency different from that of said mean frequency; a superregenerative wave-signal phase detector for utilizing said angular-velocity-modulated signal and said phase-reference signal and having a period of maximum sensitivity in each quench cycle occurring within an oscillation-generating period of said blocking oscillator; and means for applying said phase-reference signal to said detector at least during said maximum-sensitivity period of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

14. A system for receiving an angular-velocity-modulated wave signal having a given mean frequency comprising: a blocking oscillator for supplying a continuous-phase reference signal having a frequency different from that of said mean frequency, said oscillator periodically generating oscillations of a high effective intensity compared to said angular-velocity-modulated signal and having residual oscillations throughout the intervals between the generation of oscillations; a superregenerative wave-signal phase detector for utilizing said angular-velocity-modulated signal and said phase-reference signal and having a period of maximum sensitivity in each quench cycle occurring within an oscillation-generating period of said blocking oscillator; and means for applying said phase-reference signal to said detector at least during said maximum-sensitivity period of each quench cycle of said detector; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

15. A system for receiving an angular-velocity-modulated wave signal comprising: a blocking oscillator for supplying a continuous-phase reference signal, said oscillator periodically generating oscillations of a different frequency from and a high effective intensity compared to said angular-velocity-modulated signal and having residual oscillations throughout the intervals between the generation of oscillations; a superregenerative wave-signal phase detector of the separately quenched type for utilizing said angular-velocity-modulated signal; means for deriving from said oscillator and for applying to said detector a periodic quench signal having a frequency corresponding to the blocking frequency of said oscillator and having a time relation such that said detector exhibits maximum sensitivity in each quench cycle and within each oscillation-generating period of said oscillator; means for applying said phase-reference signal to said detector at least during said maximum-sensitivity period of each quench cycle of said detector; said detector being responsive to said angular-velocity-modulated signal and said phase-reference signal during said maximum sensitivity periods to effect therein a phase comparison of said angular-velocity-modulated signal and said phase-reference signal to develop an output signal having characteristic variations representing the modulation components of said angular-velocity-modulated signal; and means for utilizing said output signal of said detector to control the blocking frequency of said oscillator to tend to maintain a substantially fixed apparent phase relationship between said angular-velocity-modulated signal and said phase-reference signal.

16. A system for receiving an angular-velocity-modulated wave signal comprising: a blocking oscillator for supplying a continuous-phase reference signal, said oscillator periodically generating oscillations of a different frequency from and a high effective intensity compared to said angular-velocity-modulated signal and having residual oscillations throughout the intervals between the generation of oscillations; a reactance tube coupled to said oscillator to control the oscillatory frequency thereof; a superregenerative wave-signal phase detector of the separately quenched type for utilizing said angular-velocity-modulated signal; means for deriving from said oscillator and for applying to said detector a periodic quench signal having a frequency corresponding to the blocking frequency of said oscillator and having a time relation such that said detector exhibits maximum sensitivity in each quench cycle and within each oscillation-generating period of said oscillator; means for applying said phase-reference signal to said detector at least during said maximum-sensitivity period of each quench cycle of said detector; and detector being responsive to said angular-velocity-modulated signal and said phase-reference signal during said maximum sensitivity periods to effect therein a phase comparison of said angular-velocity-modulated signal and said phase-reference signal to develop an output signal having characteristic variations representing the modulation components of said angular-velocity-modulated signal; and means for applying said output signal of said detector to said reactance tube and to said oscillator to control the oscillatory frequency and the blocking frequency of said oscillator to tend to maintain a substantially fixed apparent phase relationship between said angular-velocity-modulated signal and said phase-reference signal.

17. A system for receiving an angular-velocity-modulated wave signal having a given mean frequency comprising: an oscillation generator for supplying a continuous-phase reference signal having a frequency different from that of said mean frequency; a saturation-mode superregenerative wave-signal phase detector for utilizing said angular-velocity-modulated signal and said phase-reference signal and including means for limiting oscillations generated therein to a value less than saturation-level amplitude; and means for applying said phase-reference signal to said detector during oscillation intervals thereof; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

18. A system for receiving an angular-velocity-modulated wave signal having a given mean frequency comprising: a blocking oscillator having residual oscillations throughout the blocking intervals between the generation of oscillations for supplying a continuous-phase reference signal having a frequency different from that of said mean frequency; a saturation-mode superregenerative wave-signal phase detector for utilizing said angular-velocity-modulated signal and said phase-reference signal and including means for limiting oscillations generated therein to a value less than saturation-level amplitude, said detector having periodically recurring oscillation intervals which individually start before and overlap an oscillation-generating interval of said oscillator; and means for applying said phase-reference signal to said detector during oscillation intervals thereof; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

19. A system for receiving an angular-velocity-modulated wave signal having a given mean frequency comprising: a blocking oscillator having residual oscillations throughout the blocking intervals between the generation of oscillations for supplying a continuous-phase reference signal having a frequency different from said mean frequency; a saturation-mode superregenerative wave-signal phase detector for utilizing said angular-velocity-modulated signal and including means for limiting oscillations generated therein to a value less than saturation-level amplitude, said detector being center-tuned to said mean frequency of said angular-velocity-modulated signal and side-tuned to said phase-reference signal and having periodically recurring oscillation intervals which individually start before and overlap an oscillation-generating interval of said oscillator; and means for applying said phase-reference signal to said detector during oscillation intervals thereof; said detector being responsive to said angular-velocity-modulated signal and said phase-reference signal during said oscillation intervals of said detector to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

20. A system for receiving an angular-velocity-modulated wave signal having a given mean frequency comprising: a blocking oscillator having residual oscillations throughout the blocking intervals between the generation of oscillations for supplying a continuous-phase reference signal having a frequency different from said mean frequency; a saturation-mode superregenerative wave-signal phase detector for utilizing said angular-velocity-modulated signal and including means for limiting oscillations generated therein to a value of the same order of magnitude as the oscillations generated by said oscillator but less than saturation-level amplitude, said detector being center-tuned to said mean frequency of said angular-velocity-modulated signal and side-tuned to said phase-reference signal and having periodically recurring oscillation intervals which individually start before and overlap an oscillation-generating interval of said oscillator; and means for applying said phase-reference signal to said detector during oscillation intervals thereof; said detector being responsive to said angular-velocity-modulated signal and said phase-reference signal during said oscillation intervals of said detector to effect therein a phase comparison of said angular-velocity-modulated signal and said phase-reference signal to develop an output signal having characteristic variations representing the modulation components of said angular-velocity-modulated signal; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

21. A system for receiving an angular-velocity-modulated wave signal having a given mean frequency comprising: an oscillation generator for supplying a continuous-phase reference signal having a frequency different from that of said mean frequency; a saturation-mode superregenerative wave-signal phase detector for utilizing said angular-velocity-modulated signal and said phase-reference signal and including means for limiting oscillations generated therein to a value less than saturation-level amplitude; means for applying said phase-reference signal to said detector during oscillation intervals thereof; said detector being center-tuned for signals of said mean frequency and being side-tuned for said phase-reference signal and responsive to both said last-mentioned signals during said selected intervals of said quench cycles to effect therein a phase comparison of said angular-velocity-modulated signal and said phase-reference signal to develop an output signal having characteristic variations representing the modulation components of said angular-velocity-modulated signal; and means for disabling said limiting means during said intervals of phase comparison; said system including means responsive to the phase relations of said angular-velocity-modulated signal and said phase-reference signal during said intervals of phase comparison for controlling an operating characteristic of said system to tend to maintain a substantially fixed apparent phase relationship between said angular-velocity-modulated signal and said phase-reference signal.

DONALD RICHMAN.

References Cited in the file of this patent

UNITED STATES PATENTS

| Number | Name | Date |
|---|---|---|
| 2,273,090 | Crosby | Feb. 17, 1942 |
| 2,363,651 | Crosby | Nov. 28, 1944 |
| 2,462,759 | McCoy | Feb. 22, 1949 |